United States Patent [19]
Okui et al.

[11] Patent Number: 4,691,235
[45] Date of Patent: Sep. 1, 1987

[54] DC RESTORATION CIRCUIT

[75] Inventors: Isamu Okui, Kumagaya; Tetsurou Onda, Fukaya, both of Japan

[73] Assignee: Kabushiki Kaisha Toshiba, Kawasaki, Japan

[21] Appl. No.: 807,581

[22] Filed: Dec. 11, 1985

[30] Foreign Application Priority Data

Dec. 12, 1984 [JP] Japan .............................. 59-262203

[51] Int. Cl.⁴ ............................................. H04N 5/18
[52] U.S. Cl. .................................... 358/172; 358/34; 358/168
[58] Field of Search ................ 358/34, 171, 168, 169, 358/172

[56] References Cited

U.S. PATENT DOCUMENTS

| | | | |
|---|---|---|---|
| 3,985,954 | 10/1976 | Kuniyoshi et al. | 358/171 |
| 4,114,179 | 9/1978 | Ilieve | 358/172 X |
| 4,143,398 | 3/1979 | Harwood et al. | 358/34 |
| 4,183,050 | 1/1980 | Tsuchiya et al. | 358/34 |
| 4,197,557 | 4/1980 | Tuma et al. | 358/34 |
| 4,204,221 | 5/1980 | Shanley, II | 358/34 |
| 4,293,874 | 10/1981 | Reneau | 358/172 |

FOREIGN PATENT DOCUMENTS

| | | |
|---|---|---|
| 2516899 | 10/1975 | Fed. Rep. of Germany . |
| 52-13965 | 2/1977 | Japan . |
| 2017451 | 10/1979 | United Kingdom . |
| 2042303 | 9/1980 | United Kingdom . |
| 1601304 | 10/1981 | United Kingdom . |
| 2084839 | 4/1982 | United Kingdom . |
| 2129248 | 5/1984 | United Kingdom . |
| 2133245 | 7/1984 | United Kingdom . |

OTHER PUBLICATIONS

Product AN 5315 (Matsushita Electric Industry KK) '84 National Electronic Components No. 6, p. 507, Matsushita Electronic Industry IC AN 5315.

Primary Examiner—Michael A. Masinick
Assistant Examiner—E. Anne Toth
Attorney, Agent, or Firm—Cushman, Darby & Cushman

[57] ABSTRACT

A DC restoration circuit includes a gate circuit, potential clamp capacitor, potential source circuit, detector circuit and mixing circuit. The gate circuit is responsive to both a first signal having a specific potential portion (pedestal level) and also to a gate signal generated at a given timing. The gate circuit detects the specific potential portion when the gate signal is generated, and provides a second signal corresponding to the detected specific potential portion. The potential clamp capacitor is used for clamping the potential of the second signal so as to provide a clamped potential. The potential source circuit is used for generating a level adjusting potential. The detector circuit is used for detecting the potential difference between the clamped potential and the level adjusting potential, and for providing a third signal corresponding to the potential difference. The mixing circuit is responsive to an input signal corresponding to the first signal, and is used for mixing the third signal with the input signal. The mixing circuit provides an output signal which contains a signal component of the specific potential portion. The DC level of this signal component depends on the level adjusting potential.

12 Claims, 5 Drawing Figures

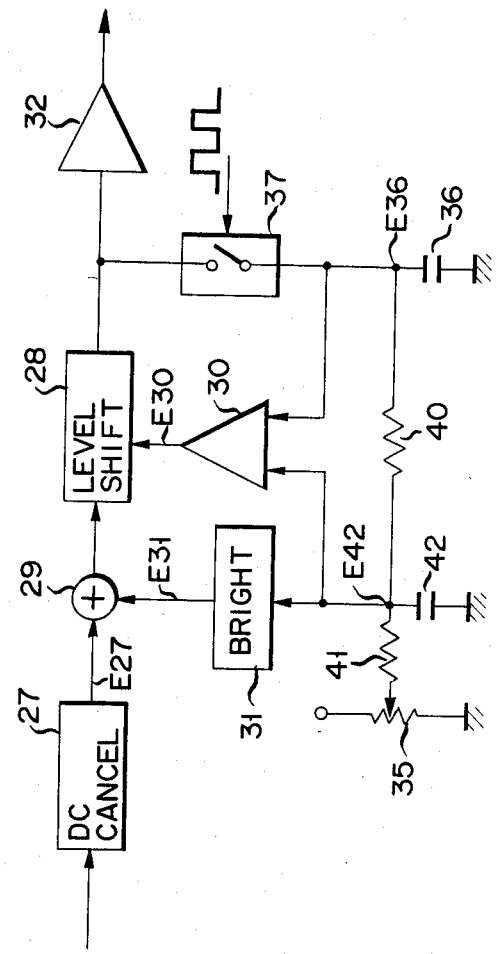
F I G. 5

DC RESTORATION CIRCUIT

BACKGROUND OF THE INVENTION

The present invention relates to a circuit for restoring the DC level of an electric signal and particularly to an improvement in a DC restoration circuit for use in the video processing circuit of a TV receiver.

In a TV receiver, the pedestal level of a video signal is clamped at a prescribed potential by a DC restoration circuit. Conventionally, a predetermined fixed DC level is applied to the clamping potential. However, in certain cases, it is preferable to somewhat change the value of the clamping potential in accordance with the contents of video signal. To achieve such clamping potential changing, a specific circuit, specifically designed to adjust the clamping potential, is required.

When this specific circuit is combined with a DC restoration circuit, it is possible to optionally change the rate of DC restoration. However, according to this circuit configuration, if an input coupling capacitor for receiving a video signal input is also employed as a clamping capacitor, an amplified output signal of the DC restoration circuit could be positively fed back to the input side thereof. This positive feedback often causes disadvantages such as variations in the brightness of the video picture, unfavorable oscillations in the circuit, etc. Further, since the circuit impedance at the input coupling capacitor is generally designed to be high, the circuit is liable to be affected by external disturbances such as noises.

SUMMARY OF THE INVENTION

It is, accordingly, an object of the present invention to provide an improved circuit for restoring the DC level of an electric signal such as a video signal, by which unfavorable oscillations and influence of external disturbances can be avoided.

To achieve the above object, the potential difference between the DC level adjusting potential (for bright) and the clamping potential (for DC restoration) is detected. DC restoration is performed in accordance with the detected potential difference, and no feedback loop, with respect to a signal input, is formed, except for that formed during the period in which DC restoration is performed.

BRIEF DESCRIPTION OF THE DRAWINGS

FIG. 5 is another modification of the block diagram shown in FIG. 1.

DETAILED DESCRIPTION OF THE PREFERRED EMBODIMENT

In the following the preferred embodiment of the present invention will be described with reference to the accompanying drawings. For the sake of clarity and ease of reference, similar circuit elements referred to repeatedly in the description are denoted by the same reference symbols throughout the drawings.

Figure 1:
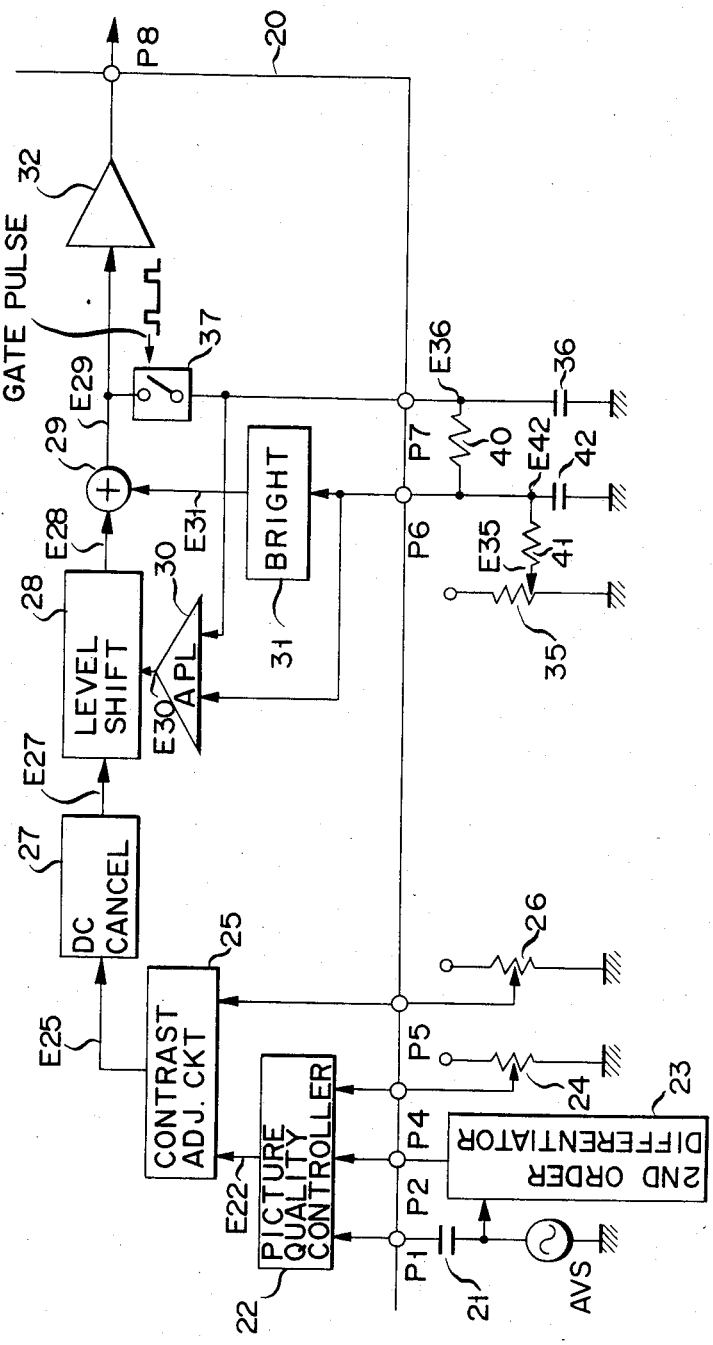
FIG. 1 is a block diagram showing an embodiment of the present invention.

FIG. 1 shows an embodiment of the present invention, in which the reference numeral 20 denotes an integrated circuit (IC) portion. Video signal AVS is input to picture quality controller 22 via input coupling capacitor 21 and terminal pin P1. Signal AVS is also input to second order differentiator 23. Differentiator 23 generates a contour correction signal which is supplied via terminal pin P2 to controller 22. Controller 22 has an amplitude adjusting node utilized to adjust the amplitude of signal AVS. The amplitude adjusting node is connected via terminal pin P4 to the slider of variable resistor 24. Resistor 24 is provided at the outside of IC portion 20 and serves to achieve picture quality control.

Output signal E22 from picture quality controller 22 is supplied to contrast adjusting circuit 25. Circuit 25 has a contrast adjusting node which is connected via terminal pin P5 to the slider of variable resistor 26. Resistor 26 is provided at the outside of IC portion 20 and serves to achieve contrast adjustment.

Output signal E25 from contrast adjusting circuit 25 is supplied to DC component canceller circuit 27. DC cancelled signal E27 may be delivered as a current signal from circuit 27. Thus, only the AC component (E27) of video signal AVS is obtained from circuit 27.

Signal E27 from DC component cancelling circuit 27 is supplied via level shift circuit 28 to DC mixer circuit 29. The degree of DC level shifting by circuit 28 is determined according to the potential of output signal E30 from APL detector 30. Detector 30 detects the average picture level (APL) of video signal AVS. In circuit 29, the potential of output signal E31 from bright circuit 31 is superposed onto output signal E28 from circuit 28. Output signal E29 from circuit 29, which is obtained by the above potential superposition, is led to output terminal pin P8 via amplifier 32.

Bright circuit 31 is responsive to bright control potential (DC level adjusting potential) E42 at terminal pin P6, and it generates signal E31 which has a DC level that corresponds with potential E42. Pin P6 is bypassed to the circuit ground via capacitor 42. Potential E42 is obtained via resistor 41 from the slider of bright adjusting variable resistor 35.

APL detector 30 is responsive to bright control potential E42, and to clamped potential (restored DC level) E36, obtained during the period when video signal AVS is pedestal clamped. Potential E36 is clamped at capacitor 36 which is coupled via terminal pin P7 to gate circuit 37. Detector 30 compares clamping potential E36 with bright control potential E42 and detects signal E30, representing the potential difference (E36−E42) therebetween.

Clamping capacitor 36 is charged or discharged in accordance with the potential of signal E30. This charge/discharge operation is performed by gate circuit 37 at the time a gate pulse is applied to circuit 37. When the gate pulse is applied, APL detector 30 supplies to level shifting circuit 28 a level control signal (E30) which is obtained based on the potential difference between E36 (varied potential obtained by the charge/discharge operation) and E42 (potential obtained by the manipulation of resistor 35). When no gate pulse is applied, detector 30 supplies to circuit 28 another level control signal (E30) which is obtained based on the potential difference between E36 (fixed potential obtained by the result of the charge/discharge operation) and E42 (fixed potential obtained by the manipulation of resistor 35).

In the above-mentioned circuit operation, the potential difference between pedestal clamping potential E36 (which defines the restored DC level of video signal AVS) and bright control potential E42 (which defines the average DC level of video signal AVS) is obtained as a voltage drop across resistor 40. This potential difference is fed, as level control signal E30, back to level shifting circuit 28 via APL detector 30. (This feedback is a sort of a negative feedback, not a positive feedback causing oscillation.) From this, a DC restoration level proportional to the average video signal level can be obtained. In addition, the rate of the DC restoration can be optionally determined according to the selection of the resistance of resistors 35, 40 and 41. Incidentally, circuit elements 35 and 40–42 may serve as the claimed potential source means.

The above-mentioned DC restoration circuit (28–31, 35–37 and 40–42 in FIG. 1) may be located on a portion of the video signal line other than the one shown in FIG. 1.

According to the DC restoration circuit of the present invention, clamping capacitor 36 does not serve as an input coupling capacitor (21) at the input terminal pin for video signal AVS. Rather, capacitor 36 serves as a shunt or bypass capacitor which greatly reduces the circuit impedance at pin P7. For this reason, clamping capacitor 36 does not cause any oscillation, and it is effective in eliminating the influence of noises induced at pin P7. In the embodiment of FIG. 1, bypass capacitor 42 is similarly effective in eliminating the influence of noises induced at pin P6.

Figure 2:
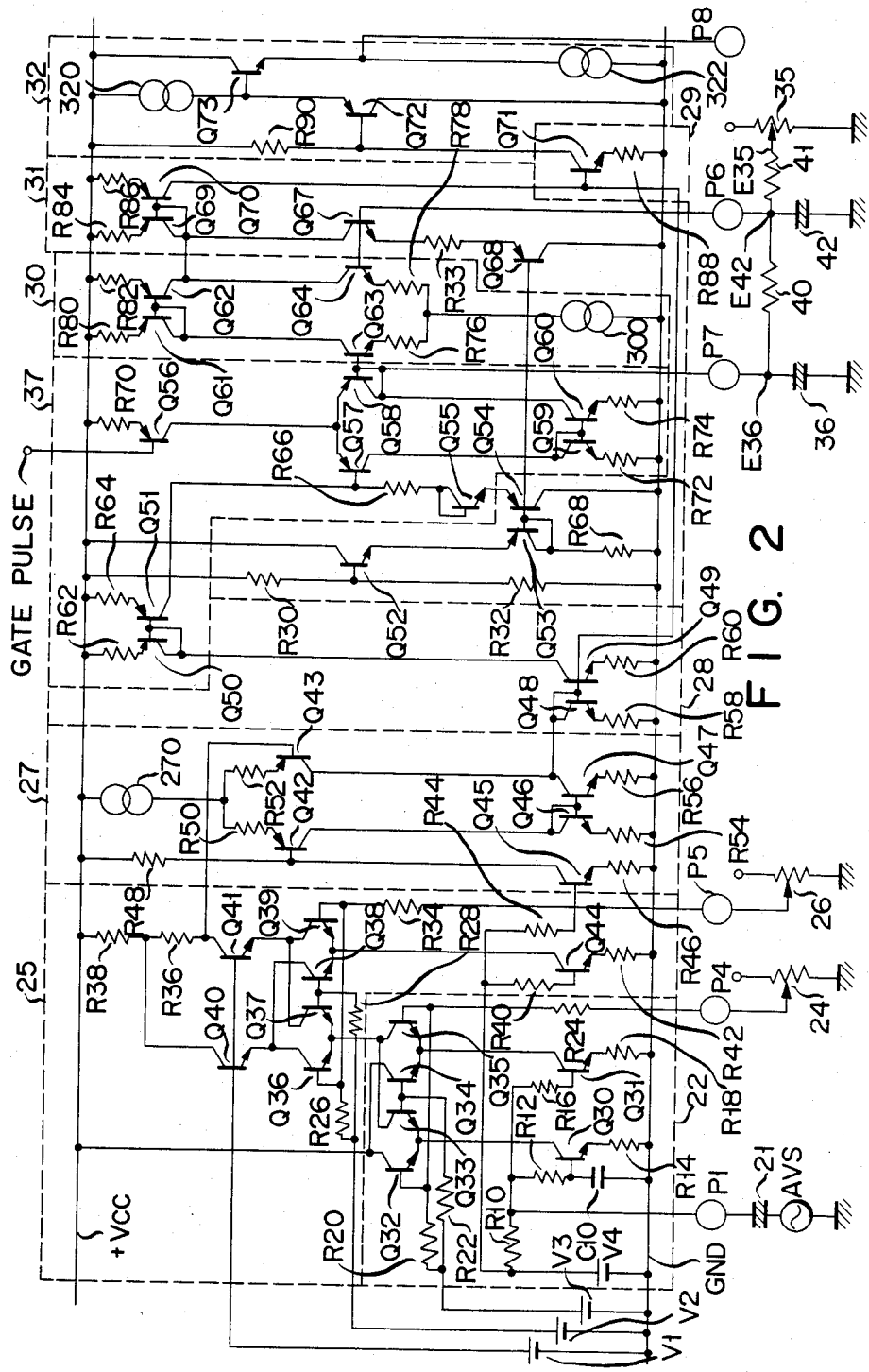
FIG. 2 is a circuit diagram showing details of the block diagram of FIG. 1.

FIG. 2 shows a detailed circuit of the block diagram shown in FIG. 1. Input pin P1 is coupled via resistor R10 to positive bias potential V4. Pin P1 is also coupled via resistor R12 to the base of NPN transistor Q30, and via resistor R16 to the base of NPN transistor Q31. The base of Q30 is circuit-grounded via capacitor C10. The emitter of Q30 is circuit-grounded via resistor R14. The emitter of Q31 is circuitgrounded via resistor R18. The collector of Q30 is connected to the emitter of each of NPN transistors Q32 and Q33. The collector of Q31 is connected to the emitters of each of NPN transistors Q34 and Q35. The base of each of Q32 and Q35 is coupled via resistor R20 to positive bias potential V3. The base of each of Q33 and Q34 is coupled via resistor R22 to bias potential V3. The base of each of Q32 and Q35 is also coupled, via resistor R24, to pin P4.

The collector of each of Q32 and Q34 is connected to positive power supply +Vcc. The collector of each of Q33 and Q35 is connected to the emitter of each of NPN transistors Q36 and Q37. The base of Q36 is connected to the base of NPN transistor Q39, and is coupled via resistor R26 to positive bias potential V2. The base of each of Q36 and Q39 is coupled via resistor R34 to pin P5. The base of Q37 is connected to the base of NPN transistor Q38, and is coupled via resistor R28 to bias potential V2. The emitter of each of Q38 and Q39 is connected to the collector of NPN transistor Q44. The base of Q44 is coupled via resistor R40 to bias potential V4. The emitter of Q44 is circuit-grounded via resistor R42. Bias potential V4 is coupled via resistor R44 to the base of NPN transistor Q45. The emitter of Q45 is circuit-grounded via resistor R46. The collector of Q45 is coupled via resistor R48 to +Vcc.

The collector of each of Q36 and Q38 is connected to the emitter of NPN transistor Q40. The collector of each of Q37 and Q39 is connected to the emitter of NPN transistor Q41. The base of each of Q40 and Q41 is connected to positive bias potential V1. The collector of Q41 is coupled to +Vcc via a series circuit of resistors R36 and R38. The collector of Q40 is connected to the junction node between R36 and R38.

The collector of Q41 is connected to the base of PNP transistor Q43. The base of PNP transistor Q42 is connected to the collector of Q45. The emitter of Q42 is coupled to the emitter of Q43 via a series circuit of resistors R50 and R52. The junction node between R50 and R52 is coupled to +Vcc via constant current source 270. The collector of Q42 is connected to the collector and base of NPN transistor Q46. The emitter of Q46 is circuit-grounded via resistor R54. The collector of Q43 is connected to the collector of NPN transistor Q47. The base of Q47 is connected to the base of Q46. The emitter of Q47 is circuit-grounded via resistor R56.

The collector of Q43 is also connected to the collector and base of NPN transistor Q48. The emitter of Q48 is circuit-grounded via resistor R58. The base of Q48 is connected to the base of NPN transistor Q49. The emitter of Q49 is circuit-grounded via resistor R60. The collector of Q49 is connected to the collector and base of PNP transistor Q50. The emitter of Q50 is coupled via resistor R62 to +Vcc. The base of Q50 is connected to the base of PNP transistor Q51. The emitter of Q51 is coupled via resistor R64 to +Vcc.

The collector of Q51 is coupled via resistor R66 to the collector and base of NPN transistor Q55. The emitter of Q55 is connected to the emitter of PNP transistor Q54. The collector of Q54 is circuit-grounded, and the base of Q54 is connected to the base and collector of PNP transistor Q53. The base and collector of Q53 is circuit-grounded via resistor R68. The emitter of Q53 is connected to the emitter of NPN transistor Q52. The collector of Q52 is connected to +Vcc, and the base of Q52 is connected to the junction node between resistors R30 and R32. The series circuit of R30 and R32 is connected between +Vcc and the circuit-ground.

The collector of Q51 is also connected to the base of PNP transistor Q57. The emitter of Q57 is connected to the emitter of PNP transistor Q58. The collector of Q57 is connected to the collector and base of NPN transistor Q59. The emitter of Q59 is circuit-grounded via resistor R72. The base of Q59 is connected to the base of NPN transistor Q60. The emitter of Q60 is circuit-grounded via resistor R74. The collector of Q60 is connected to the collector and base of Q58. The base of Q58 is connected to pin P7.

The emitter of each of Q57 and Q58 is connected to the collector of PNP transistor Q56. The emitter of Q56 is coupled via resistor R70 to +Vcc. The base of Q56 receives a gate pulse whose logic level becomes "0" when pedestal clamping is performed. Transistor Q56 serves as a constant current source only when the logic "0" gate pulse is supplied to Q56. When no gate pulse is supplied so that Q56 is cut-off, Q57–Q60 are also cut-off.

The base of Q58 is connected to the base of NPN transistor Q63. The emitter of Q63 is coupled to the emitter of NPN transistor Q64 via a series circuit of resistors R76 and R78. The junction node between R76 and R78 is coupled to the circuit-ground via constant current source 300. The collector of Q63 is connected to the collector and base of PNP transistor Q61. The emitter of Q61 is coupled to +Vcc via resistor R80. The collector of Q64 is connected to the collector of PNP transistor Q62. The base of Q62 is connected to the base of Q61. The emitter of Q62 is coupled to +Vcc via resistor R82. The base of Q64 is connected to pin P6.

Pin P6 is connected to the base of NPN transistor Q67. The emitter of Q67 is coupled via resistor R33 to the emitter of PNP transistor Q68. The collector of Q68 is circuit-grounded. The base of Q68 is connected to the base of Q53. The collector of Q67 is connected to the collector of Q62, and also to the collector and base of PNP transistor Q69. The emitter of Q69 is coupled to +Vcc via resistor R84. The base of Q69 is connected to the base of PNP transistor Q70. The emitter of Q70 is coupled to +Vcc via resistor R86.

The collector of Q70 is connected to the base of NPN transistor Q71. The base of Q71 is connected to the base of Q49. The emitter of Q71 is circuit-grounded via resistor R88. The collector of Q71 is coupled via resistor R90 to +Vcc. The collector of Q71 is connected to the base of PNP transistor Q72. The collector of Q72 is circuit-grounded. The emitter of Q72 is coupled to +Vcc via constant current source 320. The emitter of Q72 is connected to the base of NPN transistor Q73. The collector of Q73 is connected to +Vcc. The emitter of Q73 is circuit-grounded via constant current source 322. Pin P8 is connected to the emitter of Q73.

Picture quality controller 22 is formed of transistors Q30–Q35. Contrast adjusting circuit 25 is formed of transistors Q36–Q41 and Q44. DC component cancelling circuit 27 is formed of transistors Q42–Q43 and Q45–Q47. Level shifting circuit 28 is formed of transistors Q48–Q49. DC mixing circuit 29 is formed of transistor Q71. (The base of Q71 receives control information of bright circuit 31 and of APL detector 30, as well as the signal from level shifting circuit 28.) APL detector 30 is formed of transistors Q61–Q64. Bright circuit 31 is formed of transistors Q52–Q54 and Q67–Q70. Gate switch 37 is formed of transistors Q50–Q51 and Q55–Q60. Amplifier 32 is formed of transistors Q72–Q73.

Pin P6 is coupled via resistor 40 to pin P7. Pin P6 is also coupled via resistor 41 to the slider of variable resistor 35 which is used for adjusting the brightness of the video picture. Pins P6 and P7 are bypassed to the circuit-ground via capacitors 42 and 36, respectively.

Bright control potential E42 at pin P6 is applied to the base of Q64 and Q67. Potential E42 is compared with an internal reference potential which appears at the emitter of Q67. This internal reference potential depends on the voltage dividing ratio of R30 and R32, and also on the value of +Vcc. The potential difference between the internal reference potential and potential E42 appears across resistor R33. A current defined by the potential difference across resistor R33 is supplied, as a bright adjusting DC component, to the base of Q71, via the current mirror circuit formed of Q69–Q70.

A part of the output signal from level shifting circuit 28 is led via the current mirror circuit of Q50–Q51 to the base of Q57 in gate switch 37. When the gate pulse is applied to the base of Q56, gate switch 37 is turned on so that the pedestal level of video signal AVS is detected. According to the detected pedestal level, charging or discharging of capacitor 36 is performed by Q56–Q60.

The circuit constants of capacitors 36, 42 and resistors 40, 41, etc., are so determined that the potential difference between pins P7 and P6 becomes zero when no picture signal component is contained in video signal AVS. From this, variations in the pedestal level of a video signal are detected as potential variations at clamping capacitor 36.

The potential difference (E36–E42) between pins P7 and P6, caused by the pedestal level variations, is proportional to the APL (average picture level). This potential difference (E36–E42) is applied to the differential amplifier of Q63–Q64, so that currents flowing through Q61–Q62 and Q69–Q70 are controlled by the potential difference. Then, the information of the APL is fed back via Q61–Q70 to Q53, so that DC restoration is performed. In this case, the rate of DC restoration depends on the feedback loop gain which can be changed according to the ratio between resistors 40 and 41. Thus, the DC restoration rate can be made adjustable by changing the ratio between resistors 40 and 41. This means that the DC restoration rate can be readily adjusted by external devices of IC 20.

The DC restoration rate may be represented as:

$$(G - R41/R40)/(1+G)$$

where G denotes the gain of the differential amplifier of Q63–Q64, R40 denotes the resistance value of resistor 40, and R41 denotes the resistance value of resistor 41. When no resistors are used (i.e., R41 is zero and/or R41 is infinite), the above DC restoration rate may be represented as:

$$G/(1+G)$$

In this case, the maximum DC restoration rate is obtained.

Incidentally, in recent years, almost all portions of a video processing circuit have often been circuitintegrated according to currently developed IC technology. When DC restoration is to be performed using such a video processing IC, the circuit (35–36, 40–42) for adjusting bright control potential E42 and clamping potential E36 is provided as an external circuit of the IC.

The DC restoration circuit of the present invention may be located at any portion of the video signal line without fear of creating practical problems, even when the present invention is applied to an LSI of a video signal processor having the function of contrast adjustment, picture quality control, etc. In addition, the impedances of various circuit portions can be made sufficiently low so that influence of external disturbances (noises, etc.) is practically avoided, thereby achieving stable circuit operation.

Figure 3:
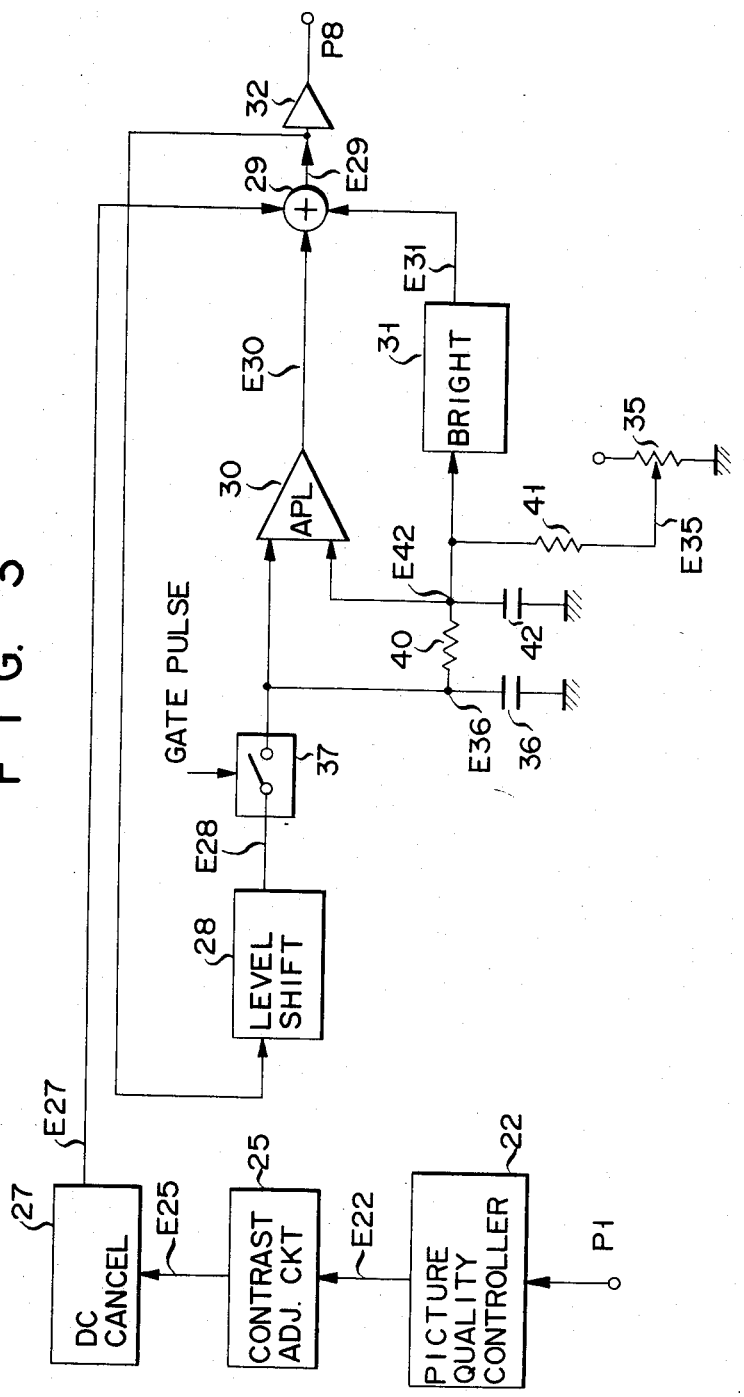
FIG. 3 is a modification of the block diagram shown in FIG. 1.

FIG. 3 is a modification of the block diagram shown in FIG. 1. (The block configuration of FIG. 3 can be derived from the circuit of FIG. 2.) In FIG. 3, signal E27 from DC component cancelling circuit 27 is supplied to DC mixing circuit 29. Signal E28 from circuit 28 is converted to pedestal clamping potential (restored DC level) E36 by the gate switching operation of gate circuit 37 and the charge storing operation of clamping capacitor 36. Potential E36 from capacitor 36 is input to APL detector 30 which receives bright control potential (DC level adjusting potential) E42 from capacitor 42. Detector 30 amplifies the potential difference between E36 and E42, and generates signal E30 whose DC level is proportional to the potential difference (E36–E42). Signal E30 is supplied to mixing circuit 29. Bright control potential E42, which may be changed by the manipulation of variable resistor 35, is converted via bright circuit 31 to signal E31. Signal E31 is also supplied to mixing circuit 29. Output signal E29 from circuit 29 is fed back to level shifting circuit 29.

Figure 4:
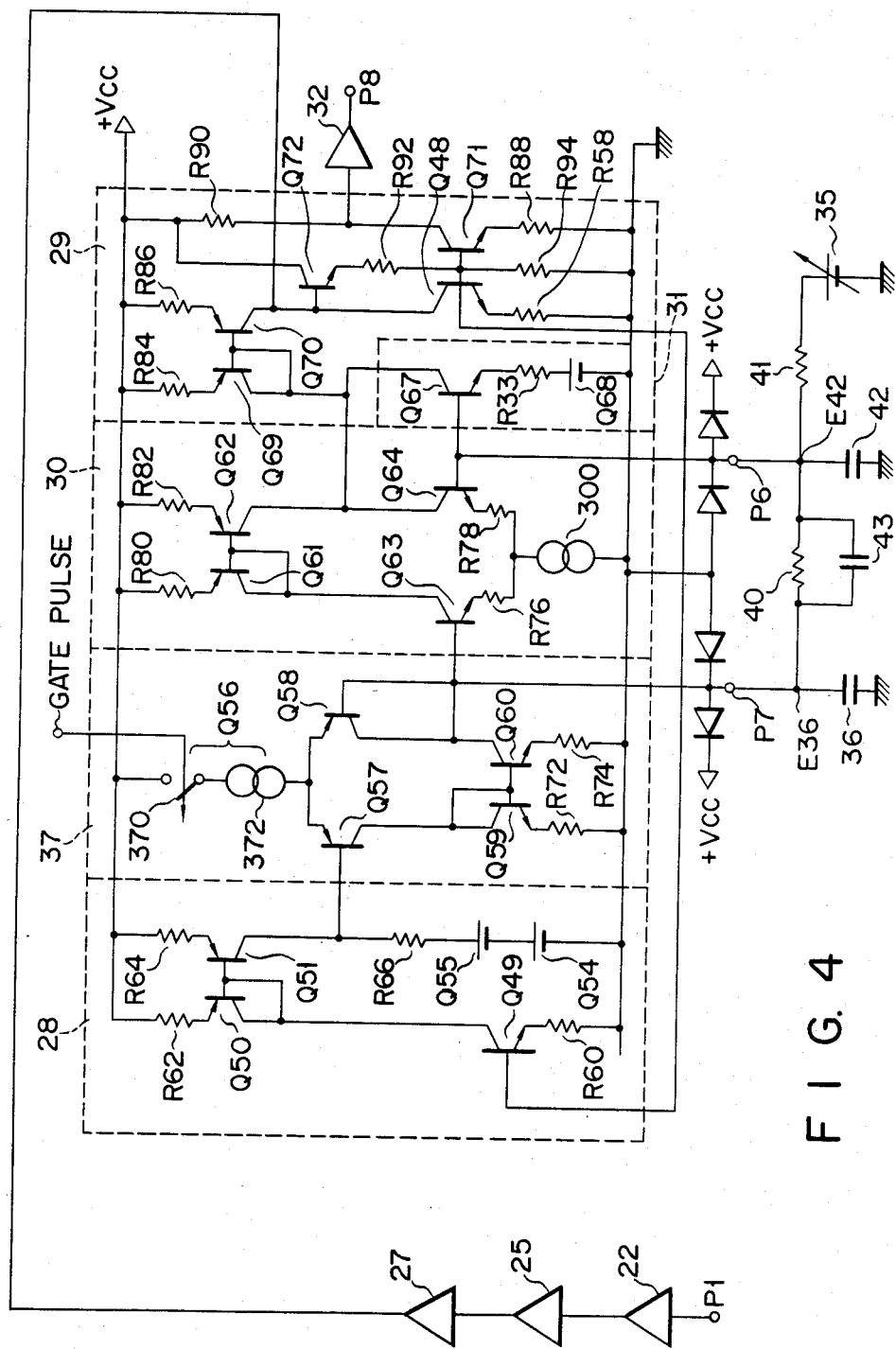
FIG. 4 shows details of the block diagram of FIG. 3.

FIG. 4 shows details of the block of FIG. 3. The content of FIG. 4 is similar to that of FIG. 2, but FIG. 4 is somewhat modified. Major differences between FIG. 2 and FIG. 4 are as follows. The output signal from DC component cancelling circuit 27 is supplied to the collector of PNP transistor Q70. The collector of Q70 is connected to the base of NPN transistor Q72 and to the collector of NPN transistor Q48. The collector of Q72 is connected to +Vcc, and the emitter of Q72 is coupled, via resistor R92, to the base of Q48. The base of Q48 is connected to the bases of NPN transistors Q49 and Q71. The emitter of Q48 is circuit-grounded via resistor R58, and the base of Q48 is circuit-grounded via resistor R94. Minor differences between FIG. 2 and FIG. 4 are that a series circuit of two diodes (serving as an overpotential protector) is coupled to each of terminal pins P7 and P6, that additional capacitor 43 is connected in parallel to resistor 40, and that resistor 35 is replaced with variable voltage source 35. In this case, the combination of capacitors 36, 42 and 43 serves as the pedestal clamping capacitor.

In FIG. 4, when the gate pulse is supplied to switching element 370 of gate circuit 37, element 370 is turned on so that constant current source 372 supplies a given constant current to the emitters of Q57 and Q58. Then, according to the base potentials of Q57 and Q58, Q58 feeds a charging current to capacitors 36, 43 and 42, or Q60 absorbs a discharge current from capacitors 36, 43 and 42. Thus, pedestal clamping potential E36 at capacitor 36 is determined during the duration of the gate pulse.

During the duration of the gate pulse, the differential amplifier circuit of Q61–Q64 performs a potential comparison between clamping potential E36 (the base potential of Q63) and bright potential E42 (the base potential of Q64). The result of the potential comparison is fed back to the base of Q49 via Q69 and Q70, so that the restored DC pedestal potential (E36) of video signal AVS equals the bright potential (E42).

During the period when the gate pulse disappears, switching element 370 of gate circuit 37 is turned off and Q57–Q60 are cut off, so that clamping potential E36 is free of video signal AVS. In this case, video signal AVS, delivered from DC component cancelling circuit 27, is fed forward to the base of Q71. At the base of Q71, the DC component (in the form of a current signal) restored by Q57–Q70 is superposed onto the video signal (in the form of a current signal) from circuit 27. Then, video signal AVS with a proper DC level is obtained via amplifier 32 from terminal pin P8, without any unfavorable oscillation. Further, since terminal pins P7 and P6 are shunted or bypassed by capacitors 36 and 42, the DC restoration circuit can be insensitive to external noises.

Incidentally, DC restoration circuit as shown by the block diagram of FIG. 5 may be employed for the present invention.

As mentioned above, according to the embodiment of the present invention, it is possible to obtain an improved DC restoration circuit which is free of unfavorable oscillation and influence from external disturbances (noises).

Although specific configurations have been illustrated and described herein, it is not intended that the invention be limited to the elements and circuit connections disclosed. A person skilled in the art will recognize that other particular elements or sub-circuit connections may be utilized without departing from the scope of the present invention.

What is claimed is:

1. A DC restoration circuit comprising:
   gate circuit means, response to a first signal having a pedestal level specific potential portion and responsive to a gate signal, for detecting the specific potential portion of said first signal when said gate signal is applied thereto, and providing a second signal corresponding to the detected specific potential portion;
   potential clamp means, coupled to said gate circuit means, for clamping the potential of said second signal to provide a clamped potential;
   potential source means for providing a level adjusting potential;
   detector means, coupled to said potential clamp means and to said potential source means, for detecting a potential difference between said clamped potential and said level adjusting potential, and providing a third signal corresponding to said potential difference;
   circuit means, coupled to said detector means and responsive to a first input signal corresponding to said first signal, for mixing said third signal with said input signal, and providing an output signal which contains a signal component corresponding to said specific potential portion, a DC level of this signal component being a function of said level adjusting potential; and
   signal application means, coupled to said circuit means and to said potential source means, for applying to said circuit means a fourth signal corresponding to said level adjusting potential, so that said output signal also has a component corresponding to said fourth signal.

2. A DC restoration circuit according to claim 1, wherein said circuit means includes:
   level shift means for shifting the DC level of said first input signal by a given degree to provide said first signal; and
   mixer means, coupled to said level shift means and said signal application means, for mixing said fourth signal with said first input signal to provide said output signal.

3. A DC restoration circuit according to claim 1, further comprising:
   canceller means, coupled to said circuit means and responsive to a second input signal, for cancelling the DC component of said second input signal to provide said first input signal which corresponds to the AC component of said second input signal.

4. A DC restoration circuit according to claim 1, wherein said potential clamp means includes a first capacitor which is charged or discharged in accordance with said second signal, and
   wherein said potential source means includes:
   potential divider means, coupled to said first capacitor, for dividing said clamped potential to provide said level adjusting potential.

5. A DC restoration circuit according to claim 4, wherein said potential source means further includes a second capacitor which is charged with said level adjusting potential.

6. A DC restoration circuit according to claim 5, wherein said potential divider means includes:

a first resistor circuit coupled to said second capacitor; and a second resistor circuit coupled between said first and second capacitors.

7. A DC restoration circuit according to claim 6, wherein said first resistor circuit is provided with:

a variable potential source, coupled via said first resistor circuit to said second resistor circuit, for varying said level adjusting potential.

8. A DC restoration circuit according to claim 6, wherein said first signal includes information of a video signal, the specific potential portion of said first signal includes a pedestal level of said video signal, and said clamped potential represents said pedestal level.

9. A DC restoration circuit according to claim 8, wherein said clamped potential defines a restored DC level of said video signal, and said level adjusting potential defines a brightness of a video picture obtained from said video signal.

10. A DC restoration circuit according to claim 6, wherein said potential difference is obtained as a voltage drop across said second resistor circuit, and a signal corresponding to said potential difference is fed back to said circuit means, so that a restored DC potential proportional to an average level of said video signal is obtained as said clamped potential.

11. A DC restoration circuit according to claim 4, wherein the rate of the DC restoration of said DC restoration circuit depends on a potential dividing ratio of said potential divider means.

12. A DC restoration circuit according to claim 8, wherein the value of said first and second capacitors is so determined that said potential difference becomes substantially zero when no video picture information is contained in said video signal, thereby detecting variations in the pedestal level of said video signal as potential variations at said first capacitor.

* * * * *